United States Patent [19]
Rosenberry, Jr.

[11] 3,800,173
[45] Mar. 26, 1974

[54] DYNAMOELECTRIC MACHINE HAVING IMPROVED VENTILATION

[75] Inventor: George M. Rosenberry, Jr., Elnora, N.Y.

[73] Assignee: General Electric Company, Schenectady, N.Y.

[22] Filed: Sept. 19, 1972

[21] Appl. No.: 290,342

[52] U.S. Cl. .................................. 310/59, 310/60
[51] Int. Cl. ............................................. H02k 9/00
[58] Field of Search ............ 310/52, 53, 58, 59, 60, 310/61, 63, 64

[56] References Cited
UNITED STATES PATENTS

| | | | |
|---|---|---|---|
| 3,250,926 | 5/1966 | O'Reilly | 310/60 |
| 3,383,529 | 5/1968 | Baumann | 310/52 |
| 2,114,907 | 4/1938 | Oesterlein | 310/63 |
| 3,610,976 | 10/1971 | Wightman | 310/60 |
| 2,782,327 | 2/1957 | Worth | 310/63 |
| 2,778,958 | 1/1957 | Hamm | 310/63 |
| 2,783,398 | 2/1957 | Haas | 310/58 |

*Primary Examiner*—R. Skudy
*Attorney, Agent, or Firm*—Vale P. Myles

[57] ABSTRACT

An open ventilation dynamoelectric machine is described wherein cooling air is directed across the radially inner and outer sides of the stator end turns before being exhausted from the end of the machine adjacent the end turns to pass axially down the motor frame. In one embodiment of the invention, the rotor fans propel the cooling air across the radially inner side of the end turns to an annular air deflector, e.g., of a corrugated design, situated in a circumferential attitude about the end turns to direct at least a portion of the air axially inward across the radially outer side of the end turns before the inwardly directed air is turned to axially return to an exhaust orifice adjacent the end of the stator frame. Also disclosed is a machine wherein the cooling air is divided into two diverse streams with one stream being directed across the radially outer side of the end turns for exhaust through axially inner apertures while the other stream is passed through axially outer openings between the frame and the end shield. The streams then are combined to flow axially down the machine frame.

12 Claims, 6 Drawing Figures

DYNAMOELECTRIC MACHINE HAVING IMPROVED VENTILATION

BACKGROUND OF THE INVENTION

The present invention relates to dynamoelectric machines, and more particularly to dynamoelectric machines having an improved cooling and ventilation system.

One of the most significant problems related to dynamoelectric machine efficiency is the problem of heat dissipation, i.e., Joulean heating of machine windings combined with heat generated by hysteresis and eddy currents within magnetic members of the machine causes operating temperatures to increase as increased power is drawn from, or applied to, the machine. Dissipation of the heat generated in the foregoing manner therefore is required in order to prevent destruction of the electrical insulation of the machine windings and to maximize the operating efficiency of the machine.

Prior art air-cooled, open ventilation machines, even with the addition of auxiliary fans to increase airflow, have had difficulty in adequately cooling the stator winding end turns, i.e., that portion of the stator windings formed in a general U-shape which allows the windings to be doubled back into the stator slots. Because of the geometric configuration and compactness of the end turns, particularly great amounts of heat are generated, and tend to be retained, within the end turns. Furthermore, because the end turns extend axially outward from the stator, conductive heat flow from the end turns to the machine frame is attenuated and generally is not sufficient to adequately dissipate the heat generated in the end turns. Consequently, various techniques for directly cooling the end turns and other heat generating regions of the machine have been proposed and/or utilized.

Typically, the airflow drawn through the end shields of open ventilation machines is directed axially through the machine, or in double ventilated machines, is passed across the radially inner side of the end turns before being exhausted from the end of the machine through which the air is admitted. The convective heat transfer to the passing air, however, often has proven insufficient to satisfactorily cool the end turns of such machines because the radially outward side of the end turns, and particularly the portion thereof near the stator, is removed from the path of the cooling airflow. Thus, even though large quantities of air flows through the end turn cavity in an attempt to enhance end turn cooling, the air near the radially outward side of the end turns often has remained stagnated diminishing heat transfer between the end turns and the circulating air.

Prior art attempts to solve this problem have included the use of enlarged fans to increase the volume of airflow, and air deflectors to guide the flow onto the end turns. For example, in U.S. patent Ser. No. 3,610,976 there is disclosed a motor ventilation technique wherein airflow across the radially inner side of the end turns is turned by a finned baffle secured to the rotor to pass over the radially outer side of the end turns before being exhausted through apertures in the machine frame to circulate spirally across the face of the stator shell. The spiral flow of the exhausted air, however, makes such ventilating technique highly ineffective for cooling machines having axially finned frames to maximize the heat transfer between the stator frame and the exterior airflow. Moreover, special apertures must be provided in the machine frame to permit exhaust of the air at a location axially inward from the end turns and special air deflectors must be positioned along the exterior of the machine frame to impart dripproof characteristics to the machine and obtain the spiral airflow across the stator frame.

SUMMARY OF THE INVENTION

It is therefore an object of ths present invention to provide a dynamoelectric machine having a new and improved ventilation system wherein special apertures are not required in the machine frame for coolant flow.

It is also an object of the present invention to provide a dynamoelectric machine having a ventilation system which provides for flow of cooling air both across the radially outward side of the end turns and axial flow of exhaust down the machine frame.

It is a still further object of this invention to provide a dynamoelectric machine wherein the radially outer face of the stator end turns is cooled without a substantial diminution in the volume of air passed axially down the finned machine frame.

In order to accomplish the foregoing, as well as further objects which will become apparent hereinafter, the present invention, in one embodiment thereof, utilizes a machine of the open ventilation variety having a cooling fan associated with its rotor. The fan is located in the end turn cavity between the stator and end shield to draw coolant, typically air, into the end turn cavity from an entrance orifice upon rotation of the fan. After flowing across the radially inner side of the stator end turns, at least a portion of the coolant is directed axially inward by an annular air deflector typically of a corrugated configuration, disposed between the stator end turns and the exhaust orifice of the machine whereupon the inwardly directed coolant is turned to flow axially outward between the air deflector and the machine housing to an exhaust orifice in the machine housing. Suitable means shrouding the exhaust orifice again turns the coolant axially inward to pass between fins extending outwardly from the machine housing. If desired, apertures can be provided in the air deflector to permit a portion, e.g., 40 – 60 percent, of the coolant to flow directly from the machine after scrubbing only the radially inner side of the end turns with the remainder of the coolant being directed by the air deflector across the radially outer side of the end turns before combining with the directly exhausted coolant stream for exhaust through an axial outer orifice to be directed down the machine frame. Alternatively, the coolant flow through the end turn cavity is divided into two streams; a first stream which passes across the radially outer side of the end turns for exhaust through an axially inner exhaust orifice and a second stream which is exhausted through an axially outer orifice after flowing across only the radially inner side of the end turns. The two streams then are combined by deflection means shrouding both exhaust orifice to pass the combined coolant streams axially down the motor frame.

Although the ventilated motor of this invention is described with particularity in the appended claims, a more complete understanding of the invention may be obtained from the following description of specific embodiments of the invention when taken in conjunction with the accompanying drawings wherein:

FIG. 1 is a sectional view of a portion of a dynamoelectric machine incorporating the ventilation system of the present invention, FIG. 2 is a partial axial section of the dynamoelectric machine of FIG. 1, FIG. 3 is a sectional view taken along lines 3—3 of FIG. 1 to illustrate the annular cavity utilized to distribute air along the machine frame periphery, FIG. 4 is a sectional view of a portion of a dynamoelectric machine wherein the air deflector is a smooth annular baffle, FIG. 5 is a sectional view of a dynamoelectric machine wherein the air deflector is selectively apertured to pass only a portion of the air stream across the radially outer side of the end turns before exhaust, and FIG. 6 is a sectional view of a portion of a dynamoelectric machine employing axially spaced exhaust orifices for removal of air from the machine.

DESCRIPTION OF THE PREFERRED EMBODIMENT

Figure 1:
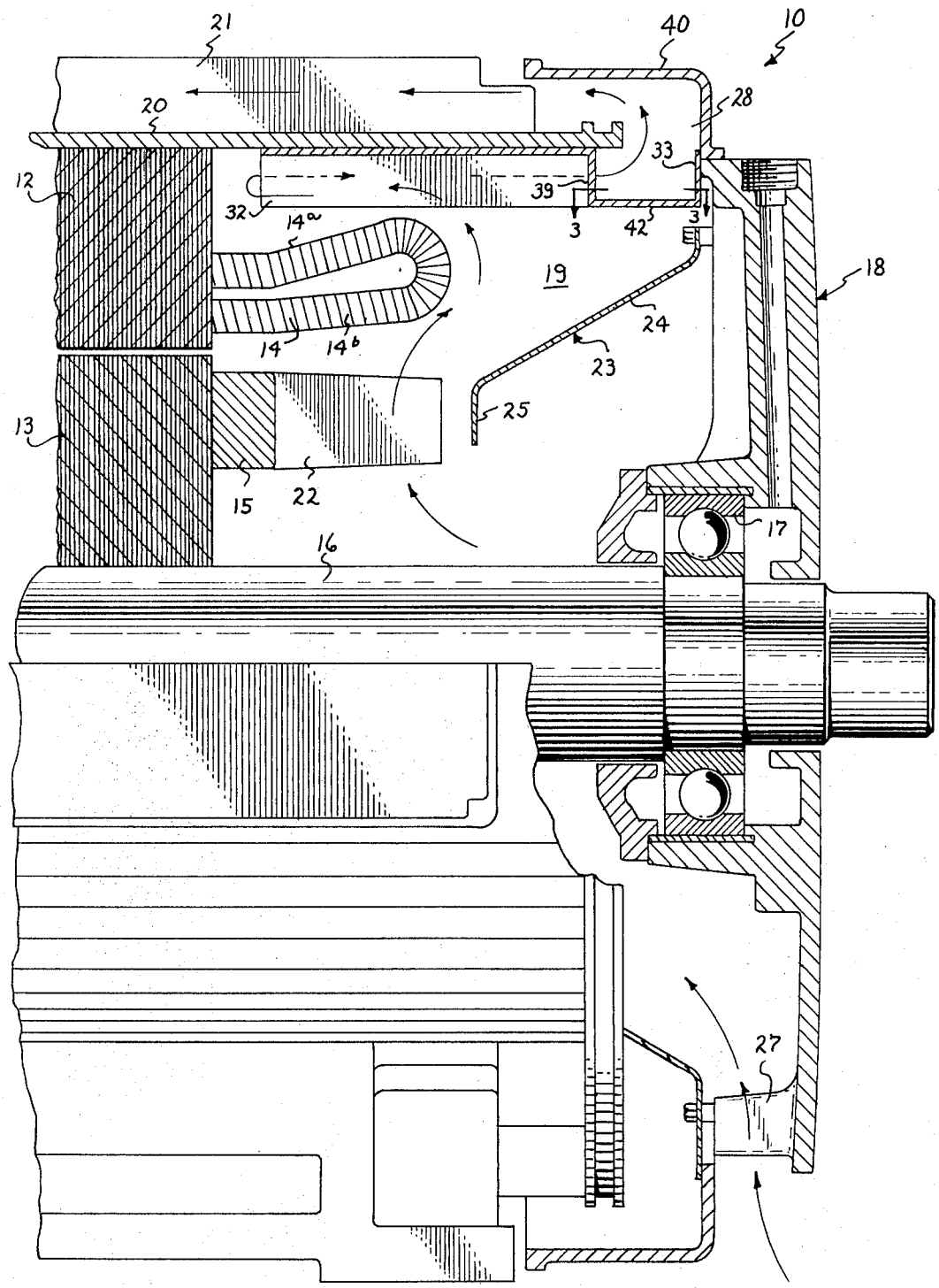

The end turn region of an induction motor 10 in accordance with this invention is illustrated in FIG. 1 and generally includes an annular stator 12 circumferentially disposed about a cylindrical rotor 13 supported upon a rotatable shaft 16 having opposite ends mounted within bearing 17. In conventional fashion, the stator and rotor are positioned to co-operate electromagnetically upon energization of the stator windings (extending axially through slots, not shown, formed along the radially inner surface of stator 12 and protruding therefrom to form end turns 14) to rotate the rotor within the stator. Because of the relatively large axial extent of the end turns in two pole machines, motor 10 typically would be a two pole machine although any number of poles could be employed in a machine constructed in accordance with this invention.

Enclosing the end of the rotor and stator is an end shield 18 which, together with the stator, partially defines end turn cavity 19 enveloping end turns 14. No claim is made herein to the particular structure of the end shield 18 (or 18a) shown in the drawings, because it does not constitute a novel aspect of the present invention. The particular end shield structure shown in the various Figures of the drawings embodies a lubrication system arrangement developed by Mr. F. W. Baumann et al. and that arrangement is disclosed in detail and claimed in a co-pending U.S. patent application Ser. No. 350,602 filed Apr. 12, 1973, entitled "Lubricating Means For A Dynamoelectric Machine End Shield Housing." A cylindrical frame 20 circumferentially surrounds the stator and extends axially beyond the stator to the end shield to annularly confine the end turn cavity. In conventional fashion, the stator frame carries a plurality of outwardly extending cooling fins 21 permitting heat generated within the stator during operation to be conducted to the fins for transfer of heat by convection to the air stream flowing between the fins (as will be more fully explained hereinafter). Although only one end of induction motor 10 is illustrated in FIG. 1, the opposite (unillustrated) end of the motor normally would be substantially identical to the structure illustrated in FIG. 1 and therefore only one end of the motor is illustrated for clarity.

As discussed above, a critical problem of motor (and other dynamoelectric machine) design has been means for cooling the end turns 14 during operation of the machine. Cooling fins 21 are adapted to carry off much of the heat generated by the stator, but the fins are incapable of adequately cooling the end turns due to insufficient thermal contact between the end turns and the stator frame. Therefore, it has become necessary to make provision for the passage of a quantity of cooling air through the end turn cavity in such a way as to carry off end turn generated heat by means of convection. While prior attempts at improving cooling by increasing the volume of air flow through the end turn cavity have met with limited success, the present invention incorporates elements for greatly improving the cooling of end turns 14 by directing the cooling flow over the radially outward side 14a of these end turns after the flow has already engaged the radially inward side 14b of the end turns.

In conventional fashion for open machine designs, fan blades 22 (cast as a composite unit with rotor conductor end ring 15) rotate with rotor 13 to move air through end turn cavity 19 in the directions shown by the arrows. A baffle 23 disposed within the end turn cavity, and having a truncated conical center section 24 and a radially extending annular end 25 adjacent the rotor, is adapted to guide air into the radially center of the motor proximate shaft 16 (and fan blades 22) from an entrance orifice formed by a plurality of apertures 27 disposed about the bottom and sides of end shield 18. An exhaust opening 28, also of the conventional variety, is provided between the end shield and frame 20 for passing air from end turn cavity 19 axially between fins 21 along the outer periphery of the frame. To this extent, the flow of cooling air through the end turn cavity of the motor is similar to those in the prior art.

In departing from the prior art, a corrugated air deflector 32 is positioned within end turn cavity 19 in a circumferential disposition about end turns 14. Deflector 32 preferably has a radial dimension such that the deflector periodically abuts the radially inner surface of frame 20 for substantially the entire circumference of the frame while a radially extending, annular plate 33 and circular strip 42 seal the axially outer end of the deflector to inhibit exhaust of air directly from end turn cavity 19 through exhaust opening 28 without passing over the radially outer side of end turns 14. Alternate corrugations in the deflector thus define a first plurality of angularly spaced passages, or channels 36 (illustrated in FIG. 2) which extend axially from partitions 39 in deflector 32 to a point proximate the stator 12 to direct airflow within the end turn cavity 19 over the back face of end turns 14. A second plurality of outwardly facing spaced channels 34 then provide axial communication between a point near stator 12 and a point beyond the axial extremity of the frame 20 where exhaust opening 28 is located. Before flowing from the motor, however, the exhaust air can circumferentially diffuse, as shown in FIG. 3, within annular zone 44 (defined by radially extending plate 33, partitions 39 within channels 36 and circular strip 43) to more equally distribute the air in a circumferential direction before axial exhaust down the machine frame between fins 21.

In the operation of motor 10, fan 22 draws a cooling flow of atmospheric air through entrance apertures 27 and the flow is directed by baffle 23 into end turn cavity 19 for engagement by fan blades 22. The blades then propel the air across the radially inner side 14b of end turns 14 to cool the end turns before the airflow is directed by baffle 23 and air deflector 32 axially inward across the radially outer side 14a of the end turns. Because the corrugated air deflector extends radially inward to a location closely adjacent the stator end turns to substantially restrict air flow between the end turns and the portion of the deflector forming exhaust channels 34, the vast majority, e.g., preferably in excess of 70 percent of the airflow across the radially outer side of the end turns, passes through channels 36.

Upon reaching the axially innermost extremity of deflector 32, the direction of flow of the cooling air is reversed as the air is directed laterally into exhaust channels 34 adjacent the recently exited channels 36. The airflow then is directed by channels 34 to opening 28, and directed by external cowl 40 axially down cooling fins 21 to increase the convective heat transfer from these fins.

Figure 2:
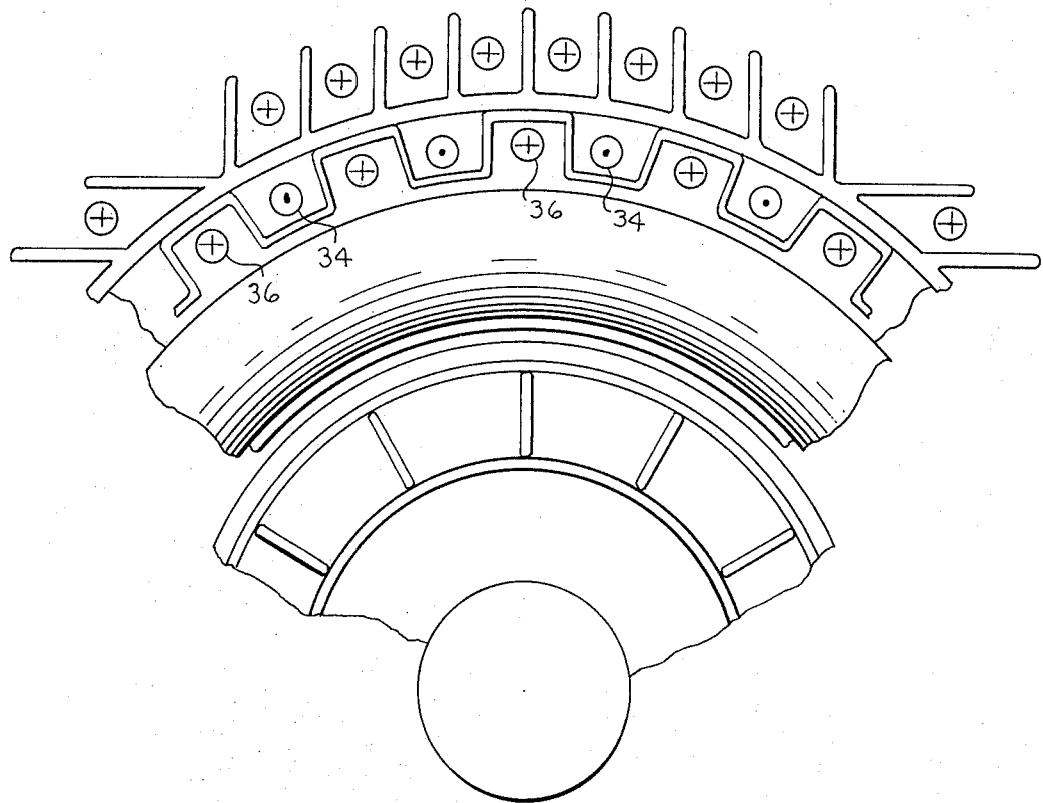
Figure 3:
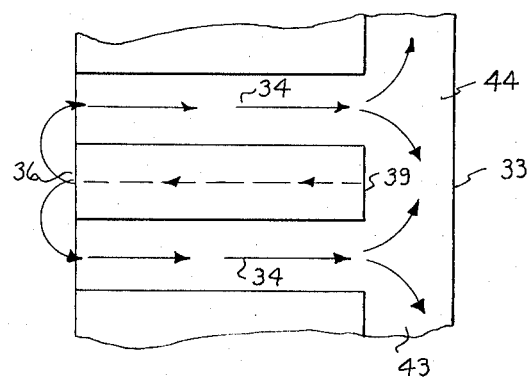
Figure 4:
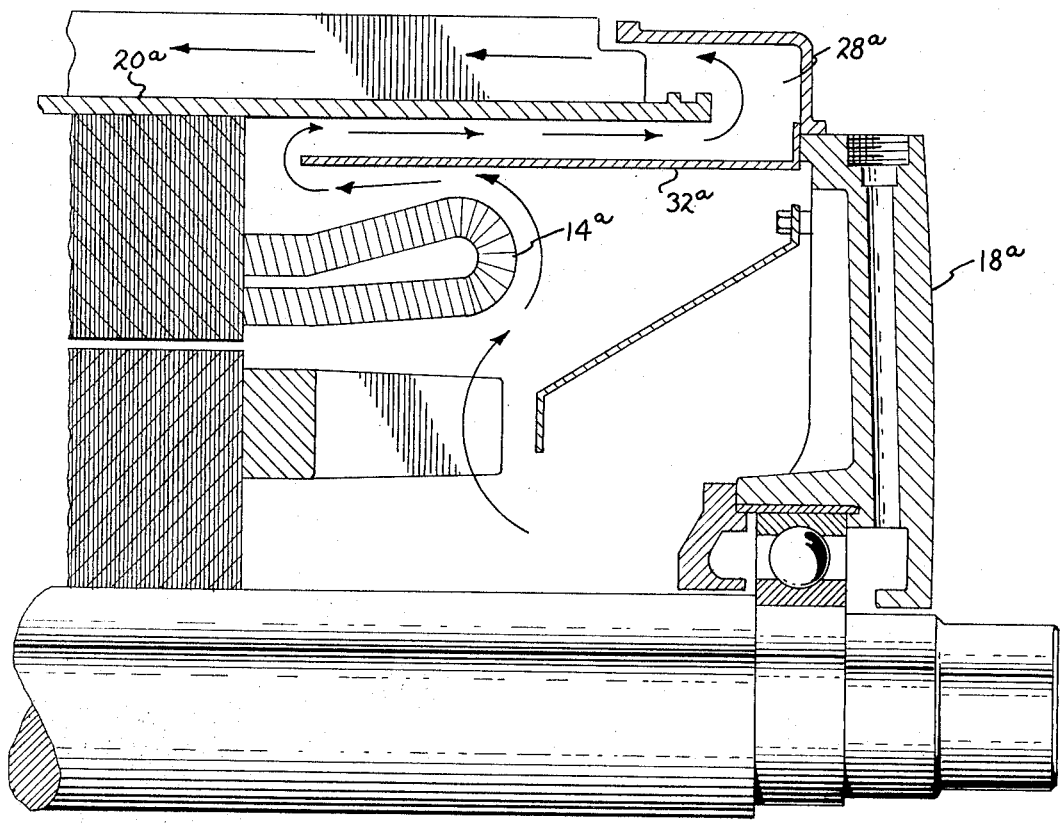

It will be appreciated that the direction of airflow across the radially outer side of the end turns to return to an exhaust orifice at an axially outboard location for passage in a reverse direction down the stator frame also may be achieved by baffle configurations other than the continuously corrugated air deflector illustrated in FIG. 2. For example, a smooth annular air deflector 32A (illustrated in FIG. 4) extending axially inward from end shield 18A into the zone between end turns 14A and stator frame 20A could be utilized to direct the air flow axially inward across the radially outer side of the end turns before the air flow would return through the zone defined by the radially outer side of the air deflector and the frame for exhaust through opening 28A. Other than the omission of corrugations in the air deflector, the motor and the flow of air through the motor, are substantially identical to the structure and ventilation previously described with reference to FIG. 1. Corresponding reference numerals therefore are utilized to identify corresponding components and a detailed description of air-flow through the motor is not required.

Figure 5:
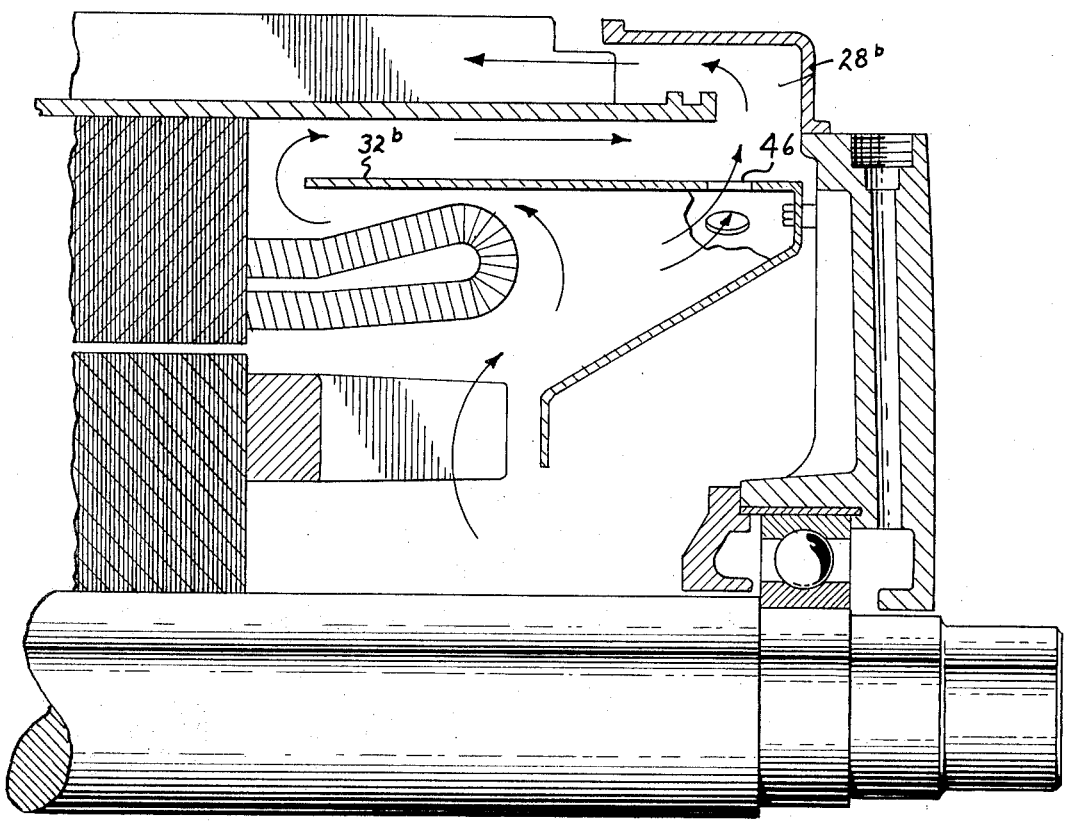

To increase the volume of air passed through the end turn cavity, the air deflector directing the air axially inward can be selectively perforated (as illustrated in FIG. 5) to permit a portion of the air to flow through opening 28B without passing over the radially outer side of the end turns. Thus, the air is divided into two streams, i.e., one passing over the radially outer side of the end turns and the other flowing through perforations 46 at the axially outer end of air deflector 32B to exhaust opening 28B. Preferably, perforations 46 are axially registered with exhaust openings 28B and the perforations are dimensioned to pass between 40 and 60 percent of the airflow through the end turn cavity across the radially outer side of the end turns.

Figure 6:
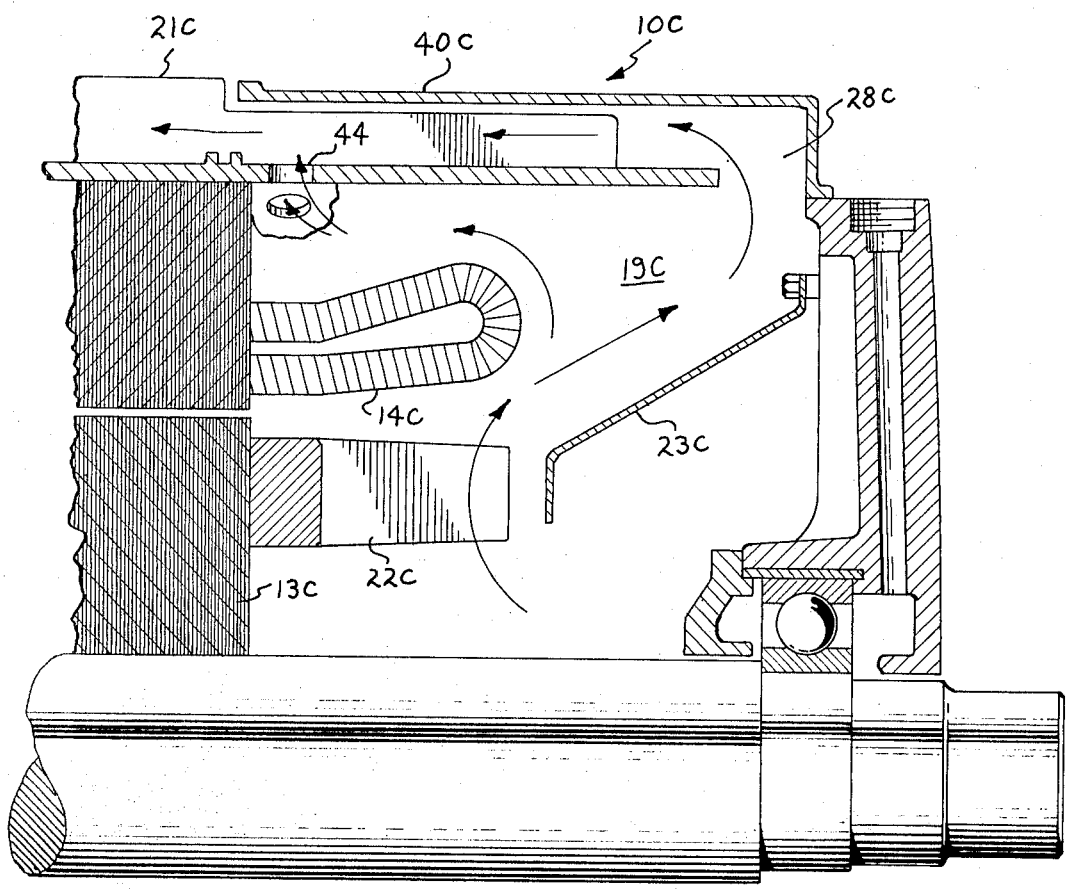

FIG. 6 illustrated another embodiment of this invention wherein exhaust opening 28C is utilized for removal of a majority of the airflow from end turn cavity 19 after cooling only the underside of the end turns while a second exhaust opening 44 is provided at a location in the frame axially registered with the portion of the end turns 14C adjacent the stator to bleed part of the air from the end turn cavity across the radially outer side of the end turns before exhaust through openings 44. An elongated cowl 40C extending axially inward of exhaust openings 44 provides the dripproof characteristics for the machine and serves to direct the combined exhaust airflow axially down the finned motor frame. Because the main air flow in the machine depicted in FIG. 6 preferably is conventional, i.e, passing across the radially inner side of the end turns before exhaust through axial outer exhaust opening 28C, a larger volume of air can be passed through end turn cavity 19C (relative to the motor structure of FIG. 1) with some of the air being diverted across the radially outer side of the end turns to inhibit a build-up of stagnant air between the end turns and the stator frame. In general, at least 70 percent of the airflow through the motor illustrated in FIG. 6 would pass through axially outer openings 28C.

During operation of the motor of FIG. 6, air enters the motor through apertures in the end shield and is directed by means of baffle 23C toward the radial center of the machine and into contact with fan blades 22C associated with rotor 13C. The air then is directed by these fan blades against the radially inner side of stator end turns 14C and a major portion of the flow exits the end turn cavity 19C through exhaust openings 28C. As stated above, the portion of airflow leaving the end turn cavity through exhaust opening 28C is directed by cowl 40C axially down cooling fins 21C to enhance the convective cooling thereof.

A second portion of the cooling airflow within the end turn cavity passes around end turns 14C and into contact with the radially outward side of the end turns before exiting through the plurality of axially inward exhaust apertures 44 in the stator frame. As a result, the cooling of the stator end turns is greatly enhanced when compared to prior art machines wherein the radially outward side of the end turn was not engaged by a moving flow of cooling air. While the ventilating technique illustrated in FIG. 6 enhances the volume of air flowing through motor 10C, such configuration generally is not preferred because of the special elongated cowl required to overlie the axially displaced exhaust openings.

While several examples of this invention have been shown and described, it will be apparent to those skilled in the art that many changes may be made without departing from this invention in its broader aspects. For example, relatively small axially inner apertures could be provided in the motor frame of FIG. 4 to permit a portion of the air passed over the radially outer face of the end turns to exit the motor without passage through exhaust opening 28A. An elongated cowl (such as is illustrated in FIG. 6) then would be utilized to combine the exhaust air streams for passage down the motor frame. The appended claims therefore are intended to cover all such changes and modifications as fall within the true spirit and scope of this invention.

What I claim as new and desire to secure by Letters Patent of the United States is:

1. An open ventilation dynamoelectric machine comprising:
   a. a stator formed of a plurality of laminations,
   b. a rotor rotatably mounted within said stator,
   c. a housing situated along the exterior of said machine, said housing including a stator frame in thermal contact with said stator laminations,
   d. a plurality of axially extending fins protruding from the outer surface of said housing,
   e. an entrance orifice situated within at least one end of said housing, f. stator winding end turns extending axially outward from said stator laminations into an end turn region between said stator laminations and said end of said housing adjacent said orifice, g. fan means for drawing a flow of coolant through said entrance orifice and directing said coolant onto the radially inward side of said stator end turns, h. deflector means 32 disposed radially outward from the radially outer surface of said end turns for directing said coolant axially inward across the radially outer side of said end turns, at least a portion of said coolant subsequently turning to flow axially outward between said deflector means and said machine housing to an exhaust orifice within said housing, and i. means disposed along the exterior of said machine housing adjacent said exhaust orifice for again directing said coolant in an axially inward direction to flow between the fins along the exterior of said housing.

2. A dynamoelectric machine according to claim 1 wherein said deflector means is a corrugated member circumferentially disposed along the outer periphery of said end turns, said coolant flowing axially inward through angularly spaced axial channels in said corrugated member before turning to flow through different axial channels in said corrugated member to said exhaust orifice.

3. A dynamoelectric machine according to claim 2 further including means forming an annular coolant flow zone along the inner circumference of said housing adjacent said exhaust orifices to permit circumferential diffusion of said coolant prior to exhaust down said machine frame.

4. A dynamoelectric machine according to claim 3 wherein said exhaust orifice is situated axially outboard of said end turn protrusion at the juncture of the finned cylindrical frame and an end shield secured to said finned frame.

5. A dynamoelectric machine according to claim 1 wherein said deflector means is an annular air deflector extending axially inward from an end shield secured to said stator frame, said deflector means extending into the annular zone between said end turns and said stator frame to terminate at an axially inward location short of the stator laminations.

6. A dynamoelectric machine according to claim 5 further including a plurality of apertures within said deflector means at a location between the axially outer end of said end turns and said end shield from which said deflector means extend.

7. A dynamoelectric machine according to claim 6 wherein said apertures in said deflector means are axially registered with said exhaust orifice in said machine housing.

8. A dynamoelectric machine according to claim 7 wherein between 40 and 60 percent of the coolant drawn into said machine by said fan means is passed across the radially outer side of said end turns by said deflector means.

9. An open ventilation dynamoelectric machine comprising:

a. a stator formed of a plurality of laminations, b. a rotor rotatably mounted within the stator, c. a housing situated along the exterior of said machine, said housing including a stator frame in thermal contact with said stator laminations, d. a plurality of axially extending fins protruding from the outer surface of said housing, e. end turns of the stator winding extending axially outwardly from said stator laminations, f. an entrance orifice in said housing, g. fan means for drawing a flow of coolant through said entrance orifice and directing said flow onto the radially inward side of said end turns, h. a first exhaust orifice disposed proximate said stator in axial registration with the portion of said end turns proximate said stator laminations for drawing part of said flow over the radially outward side of said end turns before expelling said coolant from said first exhaust orifice, i. means for directing a second portion of said coolant through a second exhaust orifice axially outward of said end turns, and j. means for directing said second portion of said coolant axially down said machine frame to mix with the portion of coolant exhausted from said first exhaust orifice for combined axial passage down said frame.

10. The dynamoelectric machine of claim 9 wherein said means for directing said second portion of coolant is an annular member extending from said second exhaust orifice to said first exhaust orifice.

11. The dynamoelectric machine of claim 10 wherein at least 70% of the coolant flow through said machine passes through the second exhaust orifice.

12. The dynamoelectric machine of claim 10 wherein said fan means include a plurality of fan blades secured to the rotor end ring and further including a baffle for directing coolant from said entrance orifice to the radial center of said machine prior to flow of coolant across the end turns.

* * * * *